US006784247B2

(12) United States Patent
Rechenberg et al.

(10) Patent No.: US 6,784,247 B2
(45) Date of Patent: Aug. 31, 2004

(54) POWDER COATING COMPOSITIONS HAVING IMPROVED MAR AND ACID RESISTANCE

(75) Inventors: Karen S. Rechenberg, Gibsonia, PA (US); Simion Coca, Pittsburgh, PA (US); Karen A. Barkac, North Huntingdon, PA (US); James B. O'Dwyer, Valencia, PA (US); Linda J. Bowser, New Kensington, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 10/357,817

(22) Filed: Feb. 4, 2003

(65) Prior Publication Data

US 2003/0166787 A1 Sep. 4, 2003

Related U.S. Application Data

(63) Continuation-in-part of application No. 10/077,645, filed on Feb. 15, 2002.

(51) Int. Cl.$^7$ .................................................. C08F 8/30
(52) U.S. Cl. ....................... 525/106; 525/107; 525/123; 525/208
(58) Field of Search .............................. 525/107, 208, 525/106, 123

(56) References Cited

U.S. PATENT DOCUMENTS

| | | | |
|---|---|---|---|
| 2,378,629 A | 6/1945 | Hanford ...................... 260/78 |
| 2,411,599 A | 11/1946 | Sparks et al. ............... 204/162 |
| 2,531,196 A | 11/1950 | Brubaker et al. .......... 260/85.5 |
| 3,947,338 A | 3/1976 | Jerabek et al. .............. 204/181 |
| 3,984,299 A | 10/1976 | Jerabek ...................... 204/181 |
| 4,147,679 A | 4/1979 | Scriven et al. ....... 260/29.2 TN |
| 4,147,688 A | 4/1979 | Makhlouf et al. .... 260/33.6 EP |
| 4,220,679 A | 9/1980 | Backhouse .................. 427/401 |
| 4,303,581 A | 12/1981 | Levine et al. ........... 260/18 PF |
| 4,403,003 A | 9/1983 | Backhouse ............... 427/407.1 |
| 4,468,307 A | 8/1984 | Wismer et al. ......... 204/181 C |
| 4,493,056 A | 1/1985 | Mao ........................... 365/149 |
| 4,877,837 A * | 10/1989 | Reising et al. .............. 525/100 |
| 4,889,890 A | 12/1989 | Kerr et al. ................... 525/113 |
| 4,937,288 A | 6/1990 | Pettit, Jr. et al. ........... 525/176 |
| 4,968,751 A * | 11/1990 | Miles et al. ................. 525/100 |
| 4,997,900 A | 3/1991 | Brinkman .................... 528/45 |
| 5,071,904 A | 12/1991 | Martin et al. ............... 524/458 |
| 5,096,556 A | 3/1992 | Corrigan et al. ......... 204/181.7 |
| 5,098,955 A | 3/1992 | Pettit, Jr. .................... 525/194 |
| 5,182,355 A | 1/1993 | Martz et al. .................. 528/75 |
| 5,202,382 A | 4/1993 | Pettit, Jr. .................... 525/108 |
| 5,214,101 A | 5/1993 | Pettit, Jr. et al. ........... 525/176 |
| 5,239,012 A | 8/1993 | McEntire et al. ........ 525/327.7 |
| 5,270,391 A * | 12/1993 | Miyazaki et al. ........... 525/194 |
| 5,356,973 A | 10/1994 | Taljan et al. ................ 524/314 |
| 5,407,707 A | 4/1995 | Simeone et al. ............ 427/410 |
| 5,439,896 A | 8/1995 | Ito et al. ..................... 525/107 |
| 5,508,337 A | 4/1996 | Wamprecht et al. ........ 524/507 |
| 5,510,444 A | 4/1996 | Halpaap et al. ............... 528/45 |
| 5,552,487 A | 9/1996 | Clark et al. ................. 525/131 |
| 5,554,692 A | 9/1996 | Ross ........................... 525/124 |
| 5,663,240 A | 9/1997 | Simeone et al. .......... 525/327.3 |
| 5,710,214 A | 1/1998 | Chou et al. ................. 525/124 |
| 5,777,061 A | 7/1998 | Yonek et al. ................. 528/45 |
| 5,807,937 A | 9/1998 | Matyjaszewski et al. ... 526/135 |
| 5,820,987 A | 10/1998 | Kaufman et al. ........... 428/413 |
| 5,976,701 A | 11/1999 | Barancyk et al. ........ 428/423.1 |
| 5,989,642 A | 11/1999 | Singer et al. ............ 427/407.1 |
| 6,111,001 A | 8/2000 | Barancyk et al. ........... 524/211 |
| 6,114,489 A | 9/2000 | Vicari et al. .................. 528/84 |
| 6,191,225 B1 * | 2/2001 | Barkac et al. ............... 525/208 |
| 6,197,883 B1 | 3/2001 | Schimmel et al. .......... 525/111 |
| 6,277,917 B1 | 8/2001 | Jurgetz et al. .............. 525/125 |
| 6,281,272 B1 | 8/2001 | Baldy et al. ................. 523/501 |

OTHER PUBLICATIONS

Greenley, "Q and e Values for Free Radical Copolymerizations of Vinyl Monomers and Telogens," *Polymer Handbook*, Fourth Edition, John Wiley & Sons, Inc., pp. 309–319, 1999.

Odian, "Chain Copolymerization," *Principles of Polymerization*, Third Edition, John Wiley & Sons, Inc., pp. 452–491, 1991.

Cowie, Alternating Copolymers, Plenum Press, pp. 1–137, 1985.

Rzaev et al., "Complex–Radical Copolymerization of 2,4, 4–trimethylpentene–1 with Maleic Anhydride," *Eur. Polym. J.*, vol. 34, No. 7, pp. 981–985, 1998.

Mashita et al., "Alternating Copolymerization of Isobutylene and Acrylic Ester with Alkylboron Halide," Polymer, vol. 36, No. 15, pp. 2973–2982, 1995.

Mashita et al., "Alternating Copolymers of Isobutylene and Acrylic Ester by Complexed Copolymerization," Polymer, vol. 36, No. 15, pp. 2983–2988, 1995.

Kuntz et al., "Poly [2,2–Dimethyl–4– (methoxylcarbonyl–)butylene]: Synthesis with an Ethylaluminum Sesquichloride–Peroxide Initiator and NMR Characterization," *J. of Polymer Science: Polymer Chemistry Edition*, vol. 16, pp. 1747–1753, 1978.

(List continued on next page.)

*Primary Examiner*—Bernard Lipman
(74) *Attorney, Agent, or Firm*—William J. Uhl

(57) ABSTRACT

A thermosetting composition that includes a co-reactable solid, particulate mixture of a film forming material having functional groups and a crosslinking agent having at least two functional groups that are reactive with the functional groups in the film forming material. The crosslinking agent includes a copolymer having at least 30 mol % of alternating structural units of a residue from a donor monomer and a residue from one or more acrylic acceptor monomers. The thermosetting composition may coat a substrate by coalescing the composition to form a continuous film and curing the composition. The thermosetting composition may be included as part of a multi-component composite coating composition that includes an optional primer coat, a base coat deposited from a pigmented film-forming composition, and a transparent top coat applied over the base coat, where either the base coat, the transparent top coat, or both, are deposited from the thermosetting composition.

21 Claims, No Drawings

OTHER PUBLICATIONS

Hirooka et al., "Complexed Copolymerization of Vinyl Compounds with Alkylaluminum Halides," *Journal of Polymer Science: Polymer Chemistry Edition*, vol. 11, pp. 1281–1306, 1973.

ASTM.D–1200—94, "Standard Test Method for Viscosity by Ford Viscosity Cup," *Amer. Soc. Test. Mat.*, pp. 103–105, 1994.

ASTM D–2369—94, "Standard Test Method for Volatile Content of Coatings," *Amer. Soc. Test. Mat.*, pp. 46–48, 1992.

ASTM D–3359—97, "Standard Test Methods for Measuring Adhesion by Tape Test," *Amer. Soc. Test. Mat.*, pp. 1–7, 1998.

ASTM D–4370—84, "Standard Test Methods for Acid and Base Milliequivalent Content of Electrocoat Bath," *Amer. Soc. Test. Mat.*, pp. 780–782, 1984.

"Reference Method 24: Determination of Volatile Matter Content, Water Content, Density, Volume Solids, and Weight Solids of Surface Coatings," *Federal Register*, EPA Reference Methods 24 and 24 A, vol. 57, No. 133, pp. 125–127, 1992.

* cited by examiner

POWDER COATING COMPOSITIONS HAVING IMPROVED MAR AND ACID RESISTANCE

CROSS-REFERENCE TO RELATED APPLICATION

This application is a Continuation-in-Part of U.S. application Ser. No. 10/077,645, filed Feb. 15, 2002, entitled "Thermosetting Compositions Containing Alternating Copolymers of Isobutylene Type Monomers," which is hereby incorporated by reference.

BACKGROUND OF THE INVENTION

1. Field of the Invention

The present invention relates generally to thermosetting compositions that contain copolymers of vinyl monomers. More specifically, the present invention is directed to a co-reactable solid particulate mixture thermosetting composition that includes functional copolymers containing isobutylene type monomers.

2. Description of Related Art

Reducing the environmental impact of coating compositions, in particular that associated with emissions into the air of volatile organics during their use, has been an area of ongoing investigation and development in recent years. Accordingly, interest in powder coatings has been increasing due, in part, to their inherently low volatile organic content (VOC), which significantly reduces air emissions during the application process. While both thermoplastic and thermoset coating compositions are commercially available, thermoset coatings are typically more desirable because of their superior physical properties, e.g., hardness and solvent resistance.

Low VOC coatings are particularly desirable in the automotive original equipment manufacture (OEM) market due to the relatively large volume of coatings that are used. However, in addition to the requirement of low VOC levels, automotive manufacturers have very strict performance requirements of the coatings that are used. For example, automotive OEM clear top coats are typically required to have a combination of good exterior durability, acid etch and water spot resistance, and excellent gloss and appearance. While liquid top coats containing, for example, capped polyisocyanate and polyol components, can provide such properties, they have the undesirable drawback of higher VOC levels relative to powder coatings that have essentially zero VOC levels.

Coating compositions containing polyol and capped polyisocyanate components ("isocyanate cured coatings") are known and have been developed for use in a number of applications, such as industrial and automotive OEM topcoats. Such isocyanate cured coating compositions are described in, for example, U.S. Pat. Nos. 4,997,900, 5,439,896, 5,508,337, 5,554,692, and 5,777,061. However, their use has been limited due to deficiencies in, for example, flow, appearance, and storage stability. Isocyanate cured coating compositions typically include a crosslinker having two or more capped isocyanate groups, e.g., a trimer of 1-isocyanato-3,3,5-trimethyl-5-isocyanatomethylcyclohexane capped with e-caprolactam, and a hydroxy functional polymer, e.g., an acrylic copolymer prepared in part from a hydroxyalkyl acrylate and/or methacrylate.

Solid particulate coating formulations referred to in the industry as "powder coatings" are finding increasing use in painting metal substrates, both as primer coatings and as top or clear coats of the base coat and clear coat composite coatings. The automotive industry provides corrosion protection and decorative appearance for motor vehicles by multilayered paint composites on the various types of surfaces of motor vehicles. The finishing layers of this composite usually include the popular base coat clear coat composites. The base coat is a pigmented layer and the clear coat is a nonpigmented or only slightly pigmented layer that is applied separately to the base coat and cured to some degree with the base coat. To provide improved coating composites for motor vehicles, the industry is seeking solutions to the problem of blemishes, smudges, and coating imperfections that occur due to the action of acid rain and road dirt, and debris that may strike areas of the vehicle. These strikes can result in unaesthetic marring of the clear coat. Mar resistance is the property of a coating film which enables the film to remain unimpaired by light abrasion, impact, or pressure.

It would be desirable to develop thermosetting "powder coating" compositions that include functional copolymers that provide excellent acid resistance and mar resistance and have low VOC levels.

SUMMARY OF THE INVENTION

The present invention is directed to a thermosetting composition that includes a co-reactable solid, particulate mixture of:

(a) a film forming material comprising functional groups; and (b) a crosslinking agent having at least two functional groups that are reactive with the functional groups in the film forming material (a) comprising a copolymer composition comprising at least 30 mol % of residues having the following alternating structural units:

—[DM—AM]— where DM represents a residue from a donor monomer having the following structure (I):

where $R^1$ is linear or branched $C_1$ to $C_4$ alkyl, $R^2$ is selected from the group consisting of methyl, linear, cyclic, or branched $C_1$ to $C_{20}$ alkyl, alkenyl, aryl, alkaryl, and aralkyl; and AM represents a residue from one or more acrylic acceptor monomers.

The present invention is also directed to a method of coating a substrate, including applying the above-described thermosetting composition to the substrate, coalescing the thermosetting composition to form a substantially continuous film, and curing the thermosetting composition. The present invention is additionally directed to substrates coated using the method.

The present invention is further directed to a multi-component composite coating composition that includes a base coat deposited from a pigmented film-forming composition, and a transparent top coat applied over the base coat, where either the base coat, the transparent top coat, or both, are deposited from the above-described thermosetting composition. The present invention is additionally directed to substrates coated by the multi-component composite coating composition.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

As used herein and in the claims, the terms "(meth) acrylate," "(meth)acrylic," and similar terms are meant to indicate the inclusion of the analogous acrylic and methacrylic and/or acrylate and methacrylate based molecules.

As used herein, the term "copolymer composition" is meant to include a synthesized copolymer, as well as residues from initiators, catalysts, and other elements attendant to the synthesis of the copolymer, but not covalently incorporated thereto. Such residues and other elements considered as part of the copolymer composition are typically mixed or co-mingled with the copolymer such that they tend to remain with the copolymer when it is transferred between vessels or between solvent or dispersion media.

As used herein, the term "substantially free" is meant to indicate that a material is present as an incidental impurity. In other words, the material is not intentionally added to an indicated composition, but may be present at minor or inconsequential levels because it was carried over as an impurity as part of an intended composition component.

The terms "donor monomer" and "acceptor monomer" are used throughout this application. With regard to the present invention, the term "donor monomer" refers to monomers that have a polymerizable, ethylenically unsaturated group that has relatively high electron density in the ethylenic double bond, and the term "acceptor monomer" refers to monomers that have a polymerizable, ethylenically unsaturated group that has relatively low electron density in the ethylenic double bond. This concept has been quantified to an extent by the Alfrey-Price Q-e scheme (Robert Z. Greenley, Polymer Handbook, Fourth Edition, Brandrup, Immergut and Gulke, editors, Wiley & Sons, New York, N.Y., pp. 309–319 (1999)). All e values recited herein are those appearing in the Polymer Handbook unless otherwise indicated.

In the Q-e scheme, Q reflects the reactivity of a monomer and e represents the polarity of a monomer, which indicates the electron density of a given monomer's polymerizable, ethylenically unsaturated group. A positive value for e generally indicates that a monomer has a relatively low electron density and is an acceptor monomer, as is the case for maleic anhydride, which has an e value of 3.69. A low or negative value for e generally indicates that a monomer has a relatively high electron density and is a donor monomer, as is the case for vinyl ethyl ether, which has an e value of −1.80.

As referred to herein, a strong acceptor monomer is meant to include those monomers with an e value greater than 2.0. The term "mild acceptor monomer" is meant to include those monomers with an e value greater than 0.5 up to and including those monomers with an e value of 2.0. Conversely, the term "strong donor monomer" is meant to include those monomers with an e value of less than −1.5, and the term "mild donor monomer" is meant to include those monomers with an e value of less than 0.5 to those with an e value of −1.5.

The present invention is directed to a thermosetting composition that includes a film forming material comprising functional groups and a crosslinking agent having functional groups that are reactive with the functional groups in the film forming material.

As used herein and in the claims, the term "film forming material" refers to a material that by itself or in combination with a co-reactive material, such as a crosslinking agent, is capable of forming a continuous film on a surface of a substrate. In an embodiment of the present invention, the film forming material may be a suitable polymer. Suitable polymers include, but are not limited to, homopolymers and copolymers having functional groups selected from polyacrylates, polymethacrylates, polyesters, polyamides, polyethers, polysilanes, and polysiloxanes. In a particular embodiment, the film forming material may be a film forming acrylic copolymer having epoxy functional groups as described in U.S. Pat. No. 6,277,917 to Jurgetz et al., which is herein incorporated by reference. Preferably, the film forming material is a solid particulate material.

The crosslinking agent may be a copolymer composition that contains a functional group-containing copolymer having at least 30 mol %, in many cases at least 40 mol %, typically at least 50 mol %, in some cases at least 60 mol %, and in other cases at least 75 mol % of residues of the copolymer derived from alternating sequences of donor monomer-acceptor monomer pairs having the alternating monomer residue units of structure:

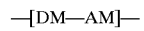

where DM represents a residue from a donor monomer and AM represents a residue from an acceptor monomer. The copolymer may be a 100% alternating copolymer of DM and AM. More particularly, at least 15 mol % of the copolymer comprises a donor monomer, which is an isobutylene-type monomer, having the following structure (I):

where $R^1$ is linear or branched $C_1$ to $C_4$ alkyl; $R^2$ is one or more of methyl, linear, cyclic, or branched $C_1$ to $C_{20}$ alkyl, alkenyl, aryl, alkaryl, and aralkyl. Further, at least 15 mol % of the copolymer includes an acrylic monomer as an acceptor monomer. The group $R^2$ may include one or more functional groups selected from epoxy, carboxylic acid, hydroxy, thiol, amide, amine, oxazoline, aceto acetate, methylol, methylol ether, isocyanate, capped isocyanate, beta hydroxyalkamide, and carbamate. Preferably, the crosslinking agent is a solid particulate material.

In an embodiment of the present invention, the copolymer crosslinking agent incorporates a substantial portion of alternating residues of a mild donor monomer as described by structure I and a mild acceptor monomer, which is an acrylic monomer. A non-limiting list of published e values for monomers that may be included as monomers described by structure I and acrylic monomers of the present invention are shown in Table 2.

TABLE 2

Alfrey-Price e values for Selected Monomers

| Monomer | e value |
|---|---|
| Monomers of structure 1 | |
| Isobutylene | −1.20[1] |
| Diisobutylene | 0.49[2] |
| Acrylic Monomers | |
| Acrylic Acid | 0.88[1] |
| Acrylamide | 0.54[1] |
| Acrylonitrile | 1.23[1] |
| Methyl Acrylate | 0.64[1] |
| Ethyl Acrylate | 0.55[1] |
| Butyl Acrylate | 0.85[1] |
| Benzyl acrylate | 1.13[1] |
| Glycidyl acrylate | 1.28[1] |

[1]Polymer Handbook, Fourth Edition (1999)
[2]Rzaev et al., Eur. Polym. J., Vol. 24, No. 7, pp. 981–985 (1998)

Any suitable donor monomer may be used in the present invention. Suitable donor monomers that may be used include strong donor monomers and mild donor monomers. Suitable donor monomers include, but are not limited to, isobutylene, diisobutylene, isoprene, dipentene, isoprenol, 1-octene, and mixtures thereof. The present invention is particularly useful for preparing alternating copolymers where a mild donor molecule is used. The present copolymers will include a mild donor monomer described by structure I, such as isobutylene and diisobutylene, 1-octene, and isoprenol, and may additionally include other suitable mild donor monomers. The mild donor monomer of structure I is present in the copolymer composition at a level of at least 15 mol %, in some cases at least 25 mol %, typically at least 30 mol % and in some cases at least 35 mol %. The mild donor monomer of structure I is present in the copolymer composition at a level of up to 50 mol %, in some cases up to 47.5 mol %, typically up to 45 mol %, and, in some cases, up to 40 mol %. The level of the mild donor monomer of structure I used is determined by the properties that are to be incorporated into the copolymer composition. Residues from the mild donor monomer of structure I may be present in the copolymer composition in any range of values inclusive of those stated above.

Suitable other donor monomers that may be used in the present invention include, but are not limited to, ethylene, butene, styrene, substituted styrenes, methyl styrene, substituted styrenes, vinyl ethers, vinyl esters, vinyl pyridines, divinyl benzene, vinyl naphthalene, and divinyl naphthalene. Vinyl esters include vinyl esters of carboxylic acids, which include, but are not limited to, vinyl acetate, vinyl butyrate, vinyl 3,4-dimethoxybenzoate, and vinyl benzoate. The use of other donor monomers is optional; when other donor monomers are present, they are present at a level of at least 0.01 mol % of the copolymer composition, often at least 0.1 mol %, typically at least 1 mol %, and, in some cases, at least 2 mol %. The other donor monomers may be present at up to 25 mol %, in some cases up to 20 mol %, typically up to 10 mol %, and, in some cases, up to 5 mol %. The level of other donor monomers used is determined by the properties that are to be incorporated into the copolymer composition. Residues from the other donor monomers may be present in the copolymer composition in any range of values inclusive of those stated above.

The copolymer composition includes acceptor monomers as part of the alternating donor monomer—acceptor monomer units along the copolymer chain. Any suitable acceptor monomer may be used. Suitable acceptor monomers include strong acceptor monomers and mild acceptor monomers. A non-limiting class of suitable acceptor monomers are those described by the structure (II):

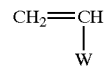

(II)

where W is selected from the group consisting of —CN, —X, and —C(=O)—Y; wherein Y is selected from the group consisting of —NR$^3_2$, —O—R$^5$—O—C (=O)—NR$^3_2$, and —OR$^4$; R$^3$ is selected from the group consisting of H, linear or branched $C_1$ to $C_{20}$ alkyl, and linear or branched $C_1$ to $C_{20}$ alkylol; R$^4$ is selected from the group consisting of H, poly(ethylene oxide), poly(propylene oxide), linear or branched $C_1$ to $C_{20}$ alkyl, alkylol, aryl and aralkyl, linear or branched $C_1$ to $C_{20}$ fluoroalkyl, fluoroaryl and fluoroaralkyl, a siloxane radical, a polysiloxane radical, an alkyl siloxane radical, an ethoxylated trimethylsilyl siloxane radical, and a propoxylated trimethylsilyl siloxane radical; R$^5$ is a divalent linear or branched $C_1$ to $C_{20}$ alkyl linking group; and X is a halide.

A class of mild acceptor monomers that are included in the present copolymer composition are acrylic acceptor monomers. Suitable acrylic acceptor monomers include those described by structure (III):

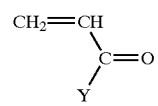

(III)

where Y is selected from —NR$^3_2$, —O—R$^5$—O—C (=O)—NR$^3_2$, and —OR$^4$; R$^3$ is selected from H, linear or branched $C_1$ to $C_{20}$ alkyl, and linear or branched $C_1$ to $C_{20}$ alkyl, aryl, and aralkyl containing one or more functional groups selected from the group of epoxy, carboxylic acid, hydroxy, thiol, amide, amine, oxazoline, aceto acetate, methylol, methylol ether, isocyanate, capped isocyanate, beta hydroxyalkamide, and carbamate; R$^4$ is selected from H, linear or branched $C_1$ to $C_{20}$ alkyl, aryl, and aralkyl containing one or more functional groups selected from the group of epoxy, carboxylic acid, hydroxy, thiol, amide, amine, oxazoline, aceto acetate, methylol, methylol ether, isocyanate, capped isocyanate, beta hydroxyalkamide, and carbamate; and R$^5$ is a divalent linear or branched $C_1$ to $C_{20}$ alkyl linking group.

The acrylic acceptor monomers of structure III are present in the copolymer composition at a level of at least 15 mol %, in some cases at least 25 mol %, typically at least 30 mol %, and, in some cases, at least 35 mol %. The acrylic acceptor monomers of structure III are present in the copolymer composition at a level of up to 50 mol %, in some cases up to 47.5 mol %, typically up to 45 mol %, and, in some cases, up to 40 mol %. The level of the acrylic acceptor monomers of structure III used is determined by the properties that are to be incorporated into the copolymer composition. Residues from the acrylic acceptor monomers of structure III may be present in the copolymer composition in any range of values inclusive of those stated above.

Suitable other mild acceptor monomers that may be used in the present invention include, but are not limited to, acrylonitrile, methacrylonitrile, vinyl halides, crotonic acid, vinyl alkyl sulfonates, and acrolein. Vinyl halides include, but are not limited to, vinyl chloride and vinylidene fluoride.

The use of other mild acceptor monomers is optional; when other mild acceptor monomers are present, they are present at a level of at least 0.01 mol % of the copolymer composition, often at least 0.1 mol %, typically at least 1 mol %, and, in some cases, at least 2 mol %. The other acceptor monomers may be present at up to 35 mol %, in some cases up to 25 mol %, typically up to 15 mol %, and, in some cases, up to 10 mol %. The level of other acceptor monomers used is determined by the properties that are to be incorporated into the copolymer composition. Residues from the other acceptor monomers may be present in the copolymer composition in any range of values inclusive of those stated above.

In an embodiment of the present thermosetting composition, the acrylic acceptor monomers include one or more selected from hydroxyethyl acrylate, hydroxypropyl acrylate, acrylic acid, dimethylaminoethyl acrylate, acrylamide, glycidyl acrylate, glycidyl methacrylate, n-butoxy methyl acrylamide, hydroxyethyl methacrylate, hydroxypropyl methacrylate, methacrylic acid, methacrylamide, 2-carbamoyloxyethyl acrylate, 2-carbamoyloxyethyl methacrylate, 2-carbamoyloxypropyl acrylate, 2-carbamoyloxypropyl methacrylate, 2-isocyanatoethyl acrylate, 2-isocyanatoethyl methacrylate, 2-isocyanatopropyl acrylate, 2-isocyanatopropyl methacrylate, 2-oxazoline ethyl acrylate, 2-oxazoline ethyl methacrylate, 2-oxazoline propyl acrylate, 2-oxazoline propyl methacrylate, aceto acetate ester of hydroxyethyl acrylate, aceto acetate ester of hydroxyethyl methacrylate, aceto acetate ester of hydroxypropyl methacrylate, and aceto acetate ester of hydroxypropyl acrylate.

In a further embodiment of the present invention, the acrylic monomers include carboxylic acid functional acrylic monomers. In a particular embodiment, the carboxylic acid functional acrylic monomer is acrylic acid.

The present copolymer has a molecular weight of at least 250, in many cases at least 500, typically at least 1,000, and, in some cases, at least 2,000. The present copolymer may have a molecular weight of up to 1,000,000, in many cases up to 500,000, typically up to 100,000, and, in some cases, up to 50,000. Certain applications will require that the molecular weight of the present copolymer not exceed 50,000, in some cases not exceed 30,000, in other cases not exceed 20,000, and, in certain instances, not exceed 16,000. The molecular weight of the copolymer is selected based on the properties that are to be incorporated into the copolymer composition. The molecular weight of the copolymer may vary in any range of values inclusive of those stated above.

The polydispersity index (PDI) of the present copolymer is not always critical. The polydispersity index of the copolymer is usually less than 4, in many cases less than 3.5, typically less than 3, and, in some cases, less than 2.5. As used herein, and in the claims, "polydispersity index" is determined from the following equation: (weight average molecular weight (Mw)/number average molecular weight (Mn)). A monodisperse polymer has a PDI of 1.0. Further, as used herein, Mn and Mw are determined from gel permeation chromatography using polystyrene standards.

The copolymer crosslinking agent of the present invention may have all of the incorporated monomer residues in an alternating architecture. A non-limiting example of a copolymer segment having 100% alternating architecture of diisobutylene (DIIB) and an acrylic acid (AA) is shown by structure IV:

—AA—DIIB—AA—DIIB—AA—DIIB—AA—DIIB—AA—DIIB—AA—DIIB—AA— (IV)

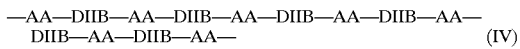

However, in most instances, the present copolymer crosslinking agent will contain alternating segments and random segments as shown by structure V, a copolymer of DIIB, AA and other monomers, M:

(V)

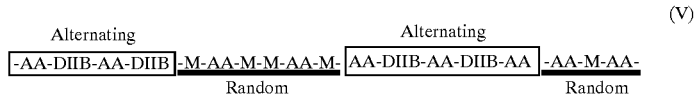

Structure V shows an embodiment of the present invention where the copolymer may include alternating segments, as shown in the boxes, and random segments, as shown by the underlined segments.

The random segments of the copolymer may contain donor or acceptor monomer residues that have not been incorporated into the copolymer composition by way of an alternating architecture. The random segments of the copolymer composition may further include residues from other ethylenically unsaturated monomers. As recited herein, all references to polymer segments derived from alternating sequences of donor monomer—acceptor monomer pairs are meant to include segments of monomer residues such as those shown by the boxes in structure V.

The other ethylenically unsaturated monomers include any suitable monomer not traditionally categorized as being an acceptor monomer or a donor monomer.

The other ethylenically unsaturated monomers, residue of monomer M of structure V, is derived from at least one ethylenically unsaturated, radically polymerizable monomer. As used herein and in the claims, "ethylenically unsaturated, radically polymerizable monomer" and like terms are meant to include vinyl monomers, allylic monomers, olefins, and other ethylenically unsaturated monomers that are radically polymerizable and not classified as donor monomers or acceptor monomers.

Classes of vinyl monomers from which M may be derived include, but are not limited to, monomer residues derived from monomers of the general formula VI:

(VI)

where $R^{11}$, $R^{12}$, and $R^{14}$ are independently selected from the group consisting of H, $CF_3$, straight or branched alkyl of 1 to 20 carbon atoms, aryl, unsaturated straight or branched alkenyl or alkynyl of 2 to 10 carbon atoms, unsaturated straight or branched alkenyl of 2 to 6 carbon atoms substituted with a halogen, $C_3$–$C_8$ cycloalkyl, heterocyclyl, and phenyl; $R^{13}$ is selected from the group consisting of H, $C_1$–$C_6$ alkyl, $COOR^{15}$, wherein $R^{15}$ is selected from the group consisting of H, an alkali metal, a $C_1$ to $C_6$ alkyl group, glycidyl, and aryl.

Specific examples of other monomers, M, that may be used in the present invention include methacrylic monomers and allylic monomers. Residue of monomer M may be derived from at least one of alkyl methacrylate having from 1 to 20 carbon atoms in the alkyl group. Specific examples of alkyl methacrylates having from 1 to 20 carbon atoms in the alkyl group from which residue of monomer M may be derived include, but are not limited to, methyl methacrylate, ethyl methacrylate, propyl methacrylate, isopropyl methacrylate, butyl methacrylate, isobutyl methacrylate, tert-butyl methacrylate, 2-ethylhexyl methacrylate, lauryl methacrylate, isobornyl methacrylate, cyclohexyl methacrylate, and 3,3,5-trimethylcyclohexyl methacrylate, as well as functional methacrylates, such as hydroxyalkyl methacrylates, oxirane functional methacrylates, and carboxylic acid functional methacrylates, such as methacrylic acid.

Residue of monomer M may also be selected from monomers having more than one methacrylate group, for example, methacrylic anhydride and diethyleneglycol bis (methacrylate).

As used herein and in the claims, by "allylic monomer(s)" what is meant is monomers containing substituted and/or unsubstituted allylic functionality, i.e., one or more radicals represented by the following general formula VII,

$$\text{H}_2\text{C}=\text{C}(R^{10})-\text{CH}_2- \quad \quad (VII)$$

where $R^{10}$ is hydrogen, halogen, or a $C_1$ to $C_4$ alkyl group. Most commonly, $R^{10}$ is hydrogen or methyl and, consequently, general formula VII represents the unsubstituted (meth)allyl radical, which encompasses both allyl and methallyl radicals. Examples of allylic monomers include, but are not limited to, (meth)allyl alcohol; (meth)allyl ethers, such as methyl (meth)allyl ether; allyl esters of carboxylic acids, such as (meth)allyl acetate, (meth)allyl butyrate, (meth)allyl 3,4-dimethoxybenzoate, and (meth)allyl benzoate.

The present copolymer composition is prepared by a method including the steps of (a) providing a donor monomer composition comprising one or more donor monomers of structure I; (b) mixing an ethylenically unsaturated monomer composition comprising one or more acceptor monomers with (a) to form a total monomer composition; and (c) polymerizing the total monomer composition in the presence of a free radical initiator. In an embodiment of the present invention, the ethylenically unsaturated monomer composition includes monomers of structure III.

In an embodiment of the present method, the monomer of structure I is present at a molar excess based on the amount of acrylic acceptor monomer. Any amount of excess monomer of structure I may be used in the present invention in order to encourage the formation of the desired alternating architecture. The excess amount of monomer of structure I may be at least 10 mol %, in some cases up to 25 mol %, typically up to 50 mol %, and, in some cases, up to 100 mol % based on the amount of acrylic acceptor monomer. When the molar excess of monomer of structure I is too high, the process may not be economical on a commercial scale.

In a further embodiment of the present method, the acrylic acceptor monomer is present in an amount of at least 15 mol %, in some cases 17.5 mol %, typically at least 20 mol %, and, in some cases, 25 mol % of the total monomer composition. The acrylic acceptor monomer may further be present in an amount up to 50 mol %, in some cases up to 47.5 mol %, typically up to 45 mol %, and, in some cases, up to 40 mol % of the total monomer composition. The level of the acrylic acceptor monomers used is determined by the properties that are to be incorporated into the copolymer composition. The acrylic acceptor monomers may be present in the monomer composition in any range of values inclusive of those stated above.

The ethylenically unsaturated monomer composition of the present method may include other donor monomers as described above, as well as other monomers designated by M and described above. The use of other mild acceptor monomers is optional in the present method. When other mild acceptor monomers are present, they are present at a level of at least 0.01 mol % of the copolymer composition, often at least 0.1 mol %, typically at least 1 mol %, and, in some cases, at least 2 mol % of the total monomer composition. The other acceptor monomers may be present at up to 35 mol %, in some cases up to 25 mol %, typically up to 15 mol %, and, in some cases, up to 10 mol % of the total monomer composition. The level of other acceptor monomers used herein is determined by the properties that are to be incorporated into the copolymer composition. Residues from the other acceptor monomers may be present in the copolymer composition in any range of values inclusive of those stated above.

The use of other monomers, M, is optional in the present method. When other monomers are present, they are present at a level of at least 0.01 mol % of the copolymer composition, often at least 0.1 mol %, typically at least 1 mol %, and, in some cases, at least 2 mol %. The other monomers may be present at up to 35 mol %, in some cases up to 25 mol %, typically up to 15 mol %, and, in some cases, up to 10 mol %. The level of other monomers used herein is determined by the properties that are to be incorporated into the copolymer composition. Residues from the other monomers, M, may be present in the copolymer composition in any range of values inclusive of those stated above.

In an embodiment of the present method, an excess of monomer of structure I is used, and the unreacted monomer of structure I is removed from the resulting copolymer composition by evaporation. The removal of unreacted monomer is typically facilitated by the application of a vacuum to the reaction vessel.

Any suitable free radical initiator may be used in the present invention. Examples of suitable free radical initiators include, but are not limited to, thermal free radical initiators, photo-initiators, and redox initiators. Examples of suitable thermal free radical initiators include, but are not limited to, peroxide compounds, azo compounds, and persulfate compounds.

Examples of suitable peroxide compound initiators include, but are not limited to, hydrogen peroxide, methyl ethyl ketone peroxides, benzoyl peroxides, di-t-butyl peroxide, di-t-amyl peroxide, dicumyl peroxide, diacyl peroxides, decanoyl peroxides, lauroyl peroxides, peroxydicarbonates, peroxyesters, dialkyl peroxides, hydroperoxides, peroxyketals, and mixtures thereof.

Examples of suitable azo compounds include, but are not limited to, 4-4'-azobis(4-cyanovaleric acid), 1-1'-azobiscyclohexanecarbonitrile), 2-2'-azobisisobutyronitrile, 2-2'-azobis(2-methylpropionamidine) dihydrochloride, 2-2'-azobis(2-methylbutyronitrile), 2-2'-azobis(propionitrile), 2-2'-azobis(2,4-dimethylvaleronitrile), 2-2'-azobis (valeronitrile), 2,2'-azobis[2-methyl-N-(2-hydroxyethyl) propionamide], 4,4'-azobis(4-cyanopentanoic acid), 2,2'-azobis(N,N'-dimethyleneisobutyramidine), 2,2'-azobis(2-amidinopropane) dihydrochloride, 2,2'-azobis(N,N'-dimethyleneisobutyramidine) dihydrochloride, and 2-(carbamoylazo)-isobutyronitrile.

In an embodiment of the present invention, the ethylenically unsaturated monomer composition and the free radical polymerization initiator are separately and simultaneously added to and mixed with the donor monomer composition. The ethylenically unsaturated monomer composition and the free radical polymerization initiator may be added to the donor monomer composition over a period of at least 15 minutes, in some cases at least 20 minutes, typically at least 30 minutes, and, in some cases, at least 1 hour. The ethylenically unsaturated monomer composition and the free radical polymerization initiator may further be added to the donor monomer composition over a period of up to 24 hours, in some case up to 18 hours, typically up to 12 hours, and, in some cases, up to 8 hours. The time for adding the ethylenically unsaturated monomer must be sufficient to maintain a suitable excess of donor monomer of structure I over unreacted acrylic acceptor monomer to encourage the formation of donor monomer—acceptor monomer alternating segments. The addition time is not so long as to render the process economically unfeasible on a commercial scale. The addition time may vary in any range of values inclusive of those stated above.

After mixing, or during addition and mixing, polymerization of the monomers takes place. The present polymerization method can be run at any suitable temperature. Suitable temperature for the present method may be ambient, at least 50° C., in many cases at least 60° C., typically, at least 75° C., and, in some cases, at least 100° C. Suitable temperature for the present method may further be described as being up to 300° C., in many cases, up to 275° C., typically, up to 250° C., and, in some cases, up to 225° C. The temperature is typically high enough to encourage good reactivity from the monomers and initiators employed. However, the volatility of the monomers and corresponding partial pressures create a practical upper limit on temperature determined by the pressure rating of the reaction vessel. The polymerization temperature may vary in any range of values inclusive of those stated above.

The present polymerization method can be run at any suitable pressure. A suitable pressure for the present method may be ambient, at least 1 psi, in many cases, at least 5 psi, typically, at least 15 psi, and, in some cases, at least 20 psi. Suitable pressures for the present method may further be described as being up to 200 psi, in many cases, up to 175 psi, typically, up to 150 psi, and, in some cases, up to 125 psi. The pressure is typically high enough to maintain the monomers and initiators in a liquid phase. The pressures employed have a practical upper limit based on the pressure rating of the reaction vessel employed. The pressure during polymerization temperature may vary in any range of values inclusive of those stated above.

The copolymer that results from the present method may be utilized as a starting material for the preparation of other polymers by using functional group transformations by methods known in the art. Functional groups that can be introduced by these methods are epoxy, carboxylic acid, hydroxy, thiol, amide, amine, oxazoline, aceto acetate, methylol, methylol ether, isocyanate, capped isocyanate, beta hydroxyalkamide, and carbamate.

For example, a copolymer of the present method comprising methyl acrylate will contain carbomethoxy groups. The carbomethoxy groups can be hydrolyzed to carboxyl groups or transesterified with an alcohol to form the corresponding ester of the alcohol. Using ammonia, the aforementioned methyl acrylate copolymer can be converted to an amide or, using a primary or secondary amine, can be converted to the corresponding N-substituted amide. Similarly, using a diamine such as ethylene diamine, one can convert the aforementioned copolymer of the present method to an N-aminoethylamide or, with ethanolamine, to an N-hydroxyethylamide. The N-aminoethylamide functionality can be further converted to an oxazoline by dehydration. The N-aminoethylamide can be further reacted with a carbonate, such as propylene carbonate, to produce the corresponding urethane functional copolymer. These transformations can be carried out to convert all of the carbomethoxy groups or can be carried out in part, leaving some of the carbomethoxy groups intact.

The thermosetting composition is a co-reactable solid, particulate mixture, or powder. The thermosetting composition includes a film forming material, including functional groups, and a crosslinking agent having functional groups that are reactive with the functional groups in the film forming material. In the powder thermosetting composition, the film forming material may have functional groups selected from epoxy, carboxylic acid, hydroxy, thiol, isocyanate, capped isocyanate, amide, amine, aceto acetate, methylol, methylol ether, oxazoline carbamate, and beta-hydroxyalkylamide. The functional groups of the copolymer may be one or more of epoxy, carboxylic acid, hydroxy, thiol, amide, amine, oxazoline, aceto acetate, methylol, methylol ether, isocyanate, capped isocyanate, beta hydroxyalkamide and carbamate. The functional groups of the present copolymer crosslinking agent will react with the functional groups in the film forming material.

The functional copolymer crosslinking agent typically has a functional group equivalent weight of from 100 to 5,000 grams/equivalent, in some cases of from 250 to 1,000 grams/equivalent, and the equivalent ratio of film forming material functional groups to copolymer crosslinking agent functional groups is within the range of 1:3 to 3:1. Typically, the copolymer crosslinking agent is present in an amount of from 1 to 45 percent by weight, based on total weight of resin solids, and the film forming material is present in an amount of from 55 to 99 percent by weight, based on total weight of resin solids.

In an embodiment of the present powder thermosetting composition, the film forming material includes a polymer that includes residues of acrylate monomers, methacrylate monomers, and mixtures thereof, and further includes functional groups. When the film forming material includes a polymer, the polymer may have a number average molecular weight of from 500 to 30,000, in some cases 500 to 16,000, and a polydispersity index of less than 4. Further, when the film forming material includes a polymer, the polymer may have a functional group equivalent weight of from 100 to 5,000 grams/equivalent, in some cases of from 250 to 1,000 grams/equivalent.

In a further embodiment of the present invention, the functional groups of the film forming material are selected from epoxy, carboxylic acid, hydroxy, thiol, isocyanate, capped isocyanate, amide, amine, aceto acetate, methylol, methylol ether, oxazoline carbamate, and beta-hydroxyalkylamide and mixtures thereof; the functional groups of the copolymer crosslinking agent are selected from epoxy, carboxylic acid, hydroxy, thiol, amide, amine, oxazoline, aceto acetate, methylol, methylol ether, isocyanate, capped isocyanate, beta hydroxyalkamide, and carbamate and mixtures thereof; and the functional groups of the film forming material are reactive with those in the copolymer crosslinking agent.

In an embodiment of the present powder thermosetting composition, the equivalent ratio functional group equivalents in the copolymer crosslinking agent to functional group equivalents in the film forming is within the range of 1:3 to 3:1.

In a further embodiment of the present powder thermosetting composition, the film forming material is present in an amount of from 55 to 99 percent by weight, based on total weight of resin solids and the functional copolymer crosslinking agent is present in an amount of from 1 to 45 percent by weight, based on total weight of resin solids.

In an additional embodiment of the present invention, the film forming material is a polymer that includes residues of monomers containing epoxy functional groups, and the acrylic acceptor monomers in the copolymer crosslinking agent include one or more carboxylic acid functional acrylic monomers. In a particular non-limiting example of this embodiment, the film forming material includes an acrylic copolymer that includes residues of epoxy functional monomers selected from glycidyl acrylate, glycidyl methacrylate, allyl glycidyl ether, vinyl glycidyl ether, and mixtures thereof; and residues of acrylate monomers and methacrylate monomers selected from linear and branched $C_1$ to $C_{20}$ alkyl, aryl, alkaryl, and aralkyl esters of acrylic acid; $C_1$ to $C_{20}$ alkyl, aryl, alkaryl, and aralkyl esters of methacrylic acid; and mixtures thereof. Further to this particular embodiment, the present copolymer crosslinking agent has at least two functional groups that are reactive with the epoxy functional groups in the film forming material, and includes at least 30 mol of the residues having the alternating structural units:

—[DM—AM]— as defined above, where the donor monomer is selected from isobutylene, diisobutylene, dipentene, isoprene, isoprenol, 1-octene, and mixtures thereof, and the acrylic acceptor monomer is selected from acrylic acid and methacrylic acid.

When the functional groups of the copolymer crosslinking agent are hydroxy functional groups and the functional group of the film forming material is a capped polyisocyanate, the capping group of the capped polyisocyanate crosslinking agent may be one or more of hydroxy functional compounds, 1H-azoles, lactams, and ketoximes. The capping group is one or more of phenol, p-hydroxy methylbenzoate, 1H-1,2,4-triazole, 1H-2,5-dimethyl pyrazole, 2-propanone oxime, 2-butanone oxime, cyclohexanone oxime, and e-caprolactam. The polyisocyanate of the capped polyisocyanate crosslinking agent is one or more of 1,6-hexamethylene diisocyanate, cyclohexane diisocyanate, α,α'-xylylene diisocyanate, α,α,α',α'-tetramethylxylylene diisocyanate, 1-isocyanato 3,3,5-trimethyl-5-isocyanatomethylcyclohexane, 2,4,4-trimethyl hexamethylene diisocyanate, 2,2,4-trimethyl hexamethylene diisocyanate, diisocyanato-dicyclohexylmethane, dimers of said polyisocyanates, and trimers of the polyisocyanates. The copolymer crosslinking agent having hydroxy functional groups typically has a hydroxy equivalent weight of from 100 to 10,000 grams/equivalent.

In another embodiment of the present powder thermosetting composition, the functional groups of the film forming material are epoxy functional groups, and the copolymer crosslinking agent has carboxylic functional groups.

In an embodiment of the present invention, when the copolymer crosslinking agent has carboxylic functional groups, the thermosetting composition may include other suitable carboxylic crosslinking agents. In this embodiment, suitable other carboxylic acid crosslinking agents include, but are not limited to, one or more of $C_4$ to $C_{20}$ aliphatic carboxylic acids, polymeric polyanhydrides, carboxylic acid functional polyesters, carboxylic acid functional polyurethanes, and mixtures thereof. Suitable $C_4$ to $C_{20}$ aliphatic carboxylic acids include, but are not limited to, one or more of dodecanedioic acid, azelaic acid, adipic acid, 1,6-hexanedioic acid, succinic acid, pimelic acid, sebacic acid, maleic acid, citric acid, itaconic acid, aconitic acid, and mixtures thereof.

In a further embodiment of the powder thermosetting composition, the functional groups of the copolymer crosslinking agent are carboxylic functional groups, and the film forming material includes a beta-hydroxyalkylamide. The beta-hydroxyalkylamide is typically one represented by structure VIII:

(VIII)

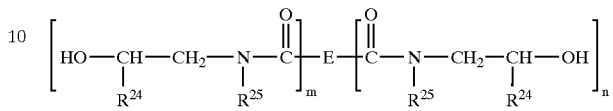

where $R^{24}$ is H or $C_1$–$C_5$ alkyl; $R^{25}$ is H, $C_1$–$C_5$ alkyl, or a group having structure IX:

(IX)

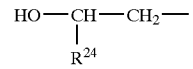

for which $R^{24}$ is as described above; E is a chemical bond or monovalent or polyvalent organic radical derived from saturated, unsaturated, or aromatic hydrocarbon radicals including substituted hydrocarbon radicals containing from 2 to 20 carbon atoms; m is 1 or 2; n is from 0 to 2; and m+n is at least 2.

The powder thermosetting composition of the present invention may also include one or more cure catalysts for catalyzing the reaction between the crosslinking agent and the functional copolymer. Classes of useful catalysts include metal compounds, in particular, organic tin compounds, and tertiary amines. Examples of organic tin compounds include, but are not limited to, tin(II) salts of carboxylic acids, e.g., tin(II) acetate, tin(II) octanoate, tin(II) ethylhexanoate and tin(II) laurate; tin(IV) compounds, e.g., dibutyltin oxide, dibutyltin dichloride, dibutyltin diacetate, dibutyltin dilaurate, dibutyltin maleate, and dioctyltin diacetate. Examples of suitable tertiary amine catalysts include, but are not limited to, diazabicyclo[2.2.2]octane and 1,5-diazabicyclo[4,3,0]non-5-ene. Preferred catalysts include tin (II) octanoate and dibutyltin(IV) dilaurate.

The powder thermosetting composition of the present invention may also include pigments and fillers. Examples of pigments include, but are not limited to, inorganic pigments, e.g., titanium dioxide and iron oxides; organic pigments, e.g., phthalocyanines, anthraquinones, quinacridones, and thioindigos; and carbon blacks. Examples of fillers include, but are not limited to, silica, e.g., precipitated silicas, clay, and barium sulfate. When used in the composition of the present invention, pigments and fillers are typically present in amounts of from 0.1 percent to 70 percent by weight based on total weight of the thermosetting composition. More often, the thermosetting composition of the present invention is used as a clear composition being substantially free of pigments and fillers.

The powder thermosetting composition of the present invention may optionally contain additives such as waxes for flow and wetting, flow control agents, e.g., poly(2-ethylhexyl)acrylate, degassing additives such as benzoin, adjuvant resin to modify and optimize coating properties, antioxidants, and ultraviolet (UV) light absorbers. Examples of useful antioxidants and UV light absorbers include those available commercially from Ciba-Geigy under the trademarks IRGANOX and TINUVIN. These optional additives, when used, are typically present in amounts up to 20 percent by weight based on total weight of the thermosetting composition.

The powder thermosetting composition of the present invention is typically prepared by first dry blending the film forming polymer, the crosslinking agent, and additives, such as flow control agents, degassing agents and catalysts, in a blender, e.g., a Henshel blade blender. The blender is operated for a period of time sufficient to result in a homogenous dry blend of the materials charged thereto. The homogenous dry blend is then melt blended in an extruder, e.g., a twin screw co-rotating extruder, operated within a temperature range of 80° C. to 140° C., e.g., from 100° C. to 125° C. The extrudate of the thermosetting composition of the present invention is cooled and, when used as a powder coating composition, is typically milled to an average particle size of from, for example, 15 to 80 microns or higher, in some cases, 15 to 30 microns.

The present invention is also directed to a method of coating a substrate, which includes the steps of:

(A) applying a thermosetting composition to the substrate;

(B) coalescing the thermosetting composition to form a substantially continuous film; and (C) curing the thermosetting composition.

The thermosetting composition is typically the powder thermosetting composition described above. The thermosetting composition includes the copolymer crosslinking agent of the present invention, which includes a functional copolymer as previously described, and a film forming material having at least two functional groups that are reactive with the functional groups of the functional copolymer crosslinking agent.

The thermosetting composition of the present invention may be applied to the substrate by any appropriate means that are known to those of ordinary skill in the art. Generally, the thermosetting composition is in the form of a dry powder and is applied by spray application. Alternatively, the powder can be slurried in a liquid medium, such as water, and spray applied. Where the language "co-reactable solid, particulate mixture" is used in the specification and claims, the thermosetting composition can be in dry powder form or in the form of a slurry.

When the substrate is electrically conductive, the thermosetting composition is typically electrostatically applied. Electrostatic spray application generally involves drawing the thermosetting composition from a fluidized bed and propelling it through a corona field. The particles of the thermosetting composition become charged as they pass through the corona field and are attracted to and deposited upon the electrically conductive substrate, which is grounded. As the charged particles begin to build up, the substrate becomes insulated, thus limiting further particle deposition. This insulating phenomenon typically limits the film build of the deposited composition to a maximum of 10 to 12 mils (250 to 300 microns), in some cases, 3 to 6 mils (75 to 150 microns).

Alternatively, when the substrate is not electrically conductive, for example as is the case with many plastic substrates, the substrate is typically preheated prior to application of the thermosetting composition. The preheated temperature of the substrate is equal to or greater than that of the melting point of the thermosetting composition, but less than its cure temperature. With spray application over preheated substrates, film builds of the thermosetting composition in excess of 6 mils (150 microns) can be achieved, e.g., 10 to 20 mils (254 to 508 microns).

After application to the substrate, the thermosetting composition is then coalesced to form a substantially continuous film. Coalescing of the applied composition is generally achieved through the application of heat at a temperature equal to or greater than that of the melting point of the composition, but less than its cure temperature. In the case of preheated substrates, the application and coalescing steps can be achieved in essentially one step.

The coalesced thermosetting composition is next cured by the application of heat. As used herein and in the claims, by "cured" is meant a three-dimensional crosslink network formed by covalent bond formation, e.g., between the reactive functional groups of the co-reactant and the epoxy groups of the polymer. The temperature at which the thermosetting composition of the present invention cures is variable and depends in part on the type and amount of catalyst used. Typically, the thermosetting composition has a cure temperature within the range of 120° C. to 180° C., in some cases, from 130° C. to 160° C.

The thermosetting compositions described above can be applied to various substrates to which they adhere, including wood; metals, such as ferrous substrates and aluminum substrates; glass; plastic and sheet molding compound based plastics.

The present invention is further directed to a multi-component composite coating composition that includes:

(a) a base coat deposited from a pigmented film-forming composition; and (b) a transparent top coat applied over the base coat, where either the base coat or the transparent top coat or both are deposited from a clear film-forming thermosetting composition including the present thermosetting composition. The multi-component composite coating composition as described herein is commonly referred to as a color-plus-clear coating composition.

The base coat may be deposited from a powder coating composition as described above or from a liquid thermosetting composition. When the base coat is deposited from a liquid thermosetting composition, the composition is allowed to coalesce to form a substantially continuous film on the substrate. Typically, the film thickness will be about 0.01 to about 5 mils (about 0.254 to about 127 microns), preferably about 0.1 to about 2 mils (about 2.54 to about 50.8 microns) in thickness. The film is formed on the surface of the substrate by driving solvent, i.e., organic solvent and/or water, out of the film by heating or by an air drying period. Preferably, the heating will only be for a short period of time, sufficient to ensure that any subsequently applied coatings can be applied to the film without dissolving the composition. Suitable drying conditions will depend on the particular composition but, in general, a drying time of from about 1 to 5 minutes at a temperature of about 68–250° F. (20–121° C.) will be adequate. More than one coat of the composition may be applied to develop the optimum appearance. Between coats, the previously applied coat may be flashed, that is, exposed to ambient conditions for about 1 to 20 minutes.

After application to the substrate, the liquid thermosetting composition, when used as the base coat, is then coalesced to form a substantially continuous film. Coalescing of the applied composition is generally achieved through the application of heat at a temperature equal to or greater than that of the melting point of the composition, but less than its cure temperature. In the case of preheated substrates, the application and coalescing steps can be achieved in essentially one step.

The coalesced thermosetting composition is next cured by the application of heat. As used herein and in the claims, by "cured" is meant a three-dimensional crosslink network formed by covalent bond formation, e.g., between the reactive functional groups of the film forming material and the crosslinking agent. The temperature at which the thermosetting composition of the present invention cures is variable and depends in part on the type and amount of catalyst used. Typically, the thermosetting composition has a cure temperature within the range of 120° C. to 180° C., in some cases, from 130° C. to 160° C.

The pigmented film-forming composition from which the base coat is deposited can be any of the compositions useful in coatings applications, particularly automotive applications in which color-plus-clear coating compositions are extensively used. Pigmented film-forming compositions conventionally comprise a resinous binder and a pigment to act as a colorant. Particularly useful resinous binders are acrylic polymers, polyesters including alkyds, polyurethanes, and the copolymer composition of the present invention.

The resinous binders for the pigmented film-forming base coat composition can be organic solvent-based materials, such as those described in U.S. Pat. No. 4,220,679, note column 2, line 24 through column 4, line 40. Also, water-based coating compositions, such as those described in U.S. Pat. Nos. 4,403,003, 4,147,679, and 5,071,904, can be used as the binder in the pigmented film-forming composition.

The pigmented film-forming base coat composition is colored and may also contain metallic pigments. Examples of suitable pigments can be found in U.S. Pat. Nos. 4,220, 679, 4,403,003, 4,147,679, and 5,071,904.

Ingredients that may be optionally present in the pigmented film-forming base coat composition are those which are well known in the art of formulating surface coatings, and include surfactants, flow control agents, thixotropic agents, fillers, anti-gassing agents, organic co-solvents, catalysts, and other customary auxiliaries. Examples of these optional materials and suitable amounts are described in the aforementioned U.S. Pat. Nos. 4,220,679, 4,403,003, 4,147, 679, and 5,071,904.

The pigmented film-forming base coat composition can be applied to the substrate by any of the conventional coating techniques, such as brushing, spraying, dipping, or flowing, but are most often applied by spraying. The usual spray techniques and equipment for air spraying, airless spraying, and electrostatic spraying employing either manual or automatic methods can be used. The pigmented film-forming composition is applied in an amount sufficient to provide a base coat having a film thickness typically of 0.1 to 5 mils (2.5 to 125 microns) and preferably 0.1 to 2 mils (2.5 to 50 microns).

After deposition of the pigmented film-forming base coat composition onto the substrate, and prior to application of the transparent top coat, the base coat can be cured or alternatively dried. In drying the deposited base coat, organic solvent and/or water is driven out of the base coat film by heating or the passage of air over its surface. Suitable drying conditions will depend on the particular base coat composition used and on the ambient humidity in the case of certain water-based compositions. In general, drying of the deposited base coat is performed over a period of from 1 to 15 minutes and at a temperature of 21° C. to 93° C.

The transparent top coat is applied over the deposited base coat by any of the methods by which coatings are known to be applied. In an embodiment of the present invention, the transparent top coat is applied by electrostatic spray application as described previously herein. When the transparent top coat is applied over a deposited base coat that has been dried, the two coatings can be co-cured to form the multi-component composite coating composition of the present invention. Both the base coat and top coat are heated together to conjointly cure the two layers. Typically, curing conditions of 130° C. to 160° C. for a period of 20 to 30 minutes are employed. The transparent top coat typically has a thickness within the range of 0.5 to 6 mils (13 to 150 microns), e.g., from 1 to 3 mils (25 to 75 microns).

In an embodiment of the present invention, the multi-component composite coating composition includes:

(a) a primer coat deposited by electrocoating a conductive substrate serving as a cathode in an electrical circuit comprising the cathode and an anode, the cathode and the anode being immersed in an aqueous electrocoating composition, by passing an electric current between the cathode and the anode to cause deposition of the electrocoating composition on the substrate as a substantially continuous film;

(b) a base coat applied over the primer coat, where the base coat is deposited from a pigmented film-forming composition; and (c) a transparent top coat applied over the base coat, wherein the base coat or the transparent top coat or both are deposited from a clear film-forming thermosetting composition including the present thermosetting composition.

In this particular embodiment of the present invention, the base coat and transparent top coat are as described above, and the primer coat is deposited from a thermosetting composition that includes a resinous phase dispersed in an aqueous medium. The resinous phase includes an ungelled copolymer composition that includes a copolymer having a functional group containing one or more active hydrogen groups and a suitable ionic group, and a curing agent having at least two functional groups that are reactive with the active hydrogen groups of the copolymer. Suitable ionic groups include anionic groups and cationic groups. A non-limiting example of a suitable cationic group is an amine salt group. Electrodeposition compositions are well known in the art and are described, for example, in U.S. Pat. Nos. 4,468,307; 4,493,056; 5,096,556 and 5,820,987.

After electrodeposition of the primer coat, a pigmented film-forming base coat composition is typically applied over the primer-coated substrate. The base coat can be cured or alternatively dried. In drying the deposited base coat, organic solvent and/or water is driven out of the base coat film by heating or the passage of air over its surface. Suitable drying conditions will depend on the particular base coat composition used and on the ambient humidity in the case of certain water-based compositions. In general, drying of the deposited base coat is performed over a period of from 1 to 15 minutes and at a temperature of 21° C. to 93° C.

The transparent top coat may be applied over the deposited base coat by any of the methods by which coatings are known to be applied. In an embodiment of the present invention, the top coat is applied by electrostatic spray application as described previously herein. When the top coat is applied over a deposited base coat that has been dried, the two coatings can be co-cured to form the primed multi-component composite coating composition of the present invention. Both the base coat and top coat are heated together to conjointly cure the,two layers. Typically, curing conditions of 130° C. to 160° C. for a period of 20 to 30 minutes are employed. The transparent top coat typically has a thickness within the range of 0.5 to 6 mils (13 to 150 microns), e.g., from 1 to 3 mils (25 to 75 microns).

In an embodiment of the present invention, additional coating layers such as a primer-surfacer may be applied to the electrodeposited primer layer prior to application of the base coat.

As used herein and in the claims, the term "primer surfacer" refers to a primer composition for use under a subsequently applied topcoating composition, and includes such materials as thermoplastic and/or crosslinking (e.g., thermosetting) film-forming resins generally known in the art of organic coating compositions. Suitable primers and primer-surfacers include spray applied primers, as are known to those skilled in the art. Examples of suitable primers include several available from PPG Industries, Inc., Pittsburgh, Pa., as DPX-1791, DPX-1804, DSPX-1537, GPXH-5379, and 1177-225A.

As is described in U.S. Pat. No. 5,356,973 to Taljan et al., the spray applied primer surfacer can be applied to the electrocoat before applying a base coat and/or topcoating. For example, substrates, such as panels, can be electrocoated with ED-11 electrodepositable coating from PPG Industries Inc. and can be primed with a commercially available PPG Industries primer surfacer coded E 730G305. This primer surfacer can be cured for 25 minutes at 329° F. (165° C.). Another example of a suitable primer surfacer can be the two-package, acrylic urethane primer surfacer known as K200/K201 more fully disclosed in U.S. Pat. No. 5,239,012 to McEntire, et al. and U.S. Pat. No. 5,182,355 to Martz et al., for such primer surfacer. This primer may be sanded with No. 400 grit paper and sealed with DP-40/401, which is a two-component epoxy primer which was reduced 100 percent by volume with a thinner, DTU 800. The K200/K201, DP-40/401, and DTU 800 are all available from PPG Industries, Inc.

An additional primer-surfacer is that available from PPG Industries, Inc. as E-5584. It is reducible with 2-butoxyethylacetate to a viscosity of 23 seconds as measured with a No. 4 Ford cup. This primer surfacer can be sprayed automatically and cured by flashing at ambient conditions for 15 minutes followed by heating for around 30 minutes at around 325° F. (165° C.) to produce coatings that can have dry film thickness of around 30 microns. The cured film is may be sanded smooth with 500 grit sandpaper. Useful automatic spraying for both the primer surfacer and the clear coat is the SPRAYMATION 310160 Automatic Test Panel Spray Unit available from SPRAYMATION Inc. The useable spray gun is a Binks Model 610, with open gun pressure 60 psi (4.22 kg/cm$^2$) and traverse speed of around 80 rpm.

Another suitable primer surfacer can be the water dispersed primer-surfacer composition with a combination of three essential resinous film-forming or binder ingredients as disclosed in U.S. Pat. No. 4,303,581 to Levine et al., which is herein incorporated by reference. The primer surfacer has a) 50 to 90 percent of a high molecular addition copolymer of a styrenic monomer with acrylic monomers in latex form, b) about 5 to 40 percent of a water soluble epoxy ester resin, and c) about 5 to 20 percent of at least one water soluble or water dispersible aminoplast resin. All percents are based on percent by weight of the total of the binder ingredients.

The present invention is more particularly described in the following examples, which are intended to be illustrative only, since numerous modifications and variations therein will be apparent to those skilled in the art. Unless otherwise specified, all parts and percentages are by weight.

EXAMPLE 1

The ingredients in Table 1 were used to synthesize an alternating copolymer, diisobutylene-alt-acrylic acid/butyl acrylate, Example A.

TABLE 1

| | Ingredients | Parts by weight (grams) |
|---|---|---|
| Charge 1 | Diisobutylene | 3136 |
| | n-Methoxypropanol[15] | 1400 |
| Charge 2 | t-Amylperoxy(2-ethyl hexanoate)[16] | 196 |
| Charge 3 | Acrylic acid | 633.6 |
| | Butyl Acrylate | 665.6 |

[15]DOWANOL ® PM solvent, Dow Chemical Co., Midland MI
[16]LUPEROX 575, ATOFINA, Paris, France Charge 1 was added to a reaction flask equipped with an agitator, a thermocouple, and a N$_2$ inlet, placed under an N$_2$ blanket and heated to 103° C. Charge 2 was added to the reaction flask over 4 hours. After 15 minutes, Charge 3 was added to the reaction flask over 4 hours. During the monomer addition, the temperature was maintained at 103° C. After Charges 2 and 3 were in the reaction flask, the reaction mixture was held for 2 hours. The reaction flask was then cooled to 25° C. Gas Chromatography (GC) analysis of the reaction mixture showed that all of the acrylates were reacted. The reaction flask was then equipped for simple vacuum distillation and the reaction mixture heated to 80° C. to remove the unreacted diisobutylene and solvent. The solids of the resulting polymer were determined to be 98.3 wt. %, after drying at 110° C. for one hour. The copolymer had a number average molecular weight, Mn=1430 and polydispersity Mw/Mn=1.8 (determined by gel permeation chromatography using polystyrene standards). The acid value of the powder was 207.1.

The ingredients in Table 2 were used to synthesize an alternating copolymer, diisobutylene-alt-acrylic acid/butyl acrylate, Example B.

TABLE 2

| | Ingredients | Parts by weight (grams) |
|---|---|---|
| Charge 1 | Diisobutylene | 784 |
| | n-Methoxypropanol[15] | 75 |
| Charge 2 | t-Amylperoxy(2-ethyl hexanoate)[16] | 73.5 |
| Charge 3 | Acrylic acid | 158.4 |
| | Butyl Acrylate | 166.4 |

[15]DOWANOL ® PM solvent, Dow Chemical Co., Midland MI
[16]LUPEROX 575, ATOFINA, Paris, France Charge 1 was added to a reaction flask equipped with an agitator, a thermocouple, and a N$_2$ inlet, placed under a blanket of N$_2$, and heated to 103° C. Charge 2 was added to the reaction flask over 4 hours. After 15 minutes, Charge 3 was added to the reaction flask over 4 hours. During the monomer addition, the temperature was maintained at 103° C. After Charge 2 and Charge 3 were in the reaction flask, the reaction mixture was held for 2 hours. The reaction flask was then cooled to 25° C. GC analysis of the reaction mixture showed that all of the acrylates were reacted. The reaction flask was then equipped for simple vacuum distillation, and the reaction mixture heated to 80° C. to remove the unreacted diisobutylene and solvent. The solids of the resulting polymer were determined to be 98.52 wt. %, at 110° C. for one hour. The copolymer had Mn=1310 and Mw/Mn=1.9 (determined by gel permeation chromatography using polystyrene standards). The acid value of the powder was 196.8.

The ingredients in Table 3 were used to synthesize an alternating copolymer, diisobutylene-alt-acrylic acid/butyl acrylate/isobornyl acrylate, Example C.

TABLE 3

| | Ingredients | Parts by weight (grams) |
|---|---|---|
| Charge 1 | Diisobutylene | 784 |
| | n-Methoxypropanol[15] | 350 |
| Charge 2 | t-Amylperoxy(2-ethyl hexanoate)[16] | 49 |
| Charge 3 | Acrylic Acid | 129.6 |
| | Butyl Acrylate | 128 |
| | Isobornyl Acrylate | 145.6 |

[15]DOWANOL ® PM solvent, Dow Chemical Co., Midland MI
[16]LUPEROX 575, ATOFINA, Paris, France Charge 1 was added to a reaction flask equipped with an agitator, a thermocouple, and a $N_2$ inlet, placed under a blanket of $N_2$, and heated to 103° C. Charge 2 was added to the reaction flask over 4 hours. After 15 minutes, Charge 3 was added to the reaction flask over 4 hours. During the monomer addition, the temperature was maintained at 103° C. After Charge 2 and Charge 3 were in the reaction flask, the reaction mixture was held for 2 hours. The reaction flask was then cooled to 25° C. GC analysis of the reaction mixture showed that all of the acrylates were reacted. The reaction flask was then equipped for simple vacuum distillation, and the reaction mixture heated to 80° C. to remove the unreacted diisobutylene and the solvent. The solids of the resulting polymer were determined to be 97.84 wt. %, at 110° C. for one hour. The copolymer had Mn=1430 and Mw/Mn=1.9 (determined by gel permeation chromatography using polystyrene standards). The acid value of the powder was 148.7.

The ingredients in Table 4 were used to synthesize an alternating copolymer, isobutylene-alt-acrylic acid, Example D.

TABLE 4

| | Ingredients | Parts by weight (grams) |
|---|---|---|
| Charge 1 | Isobutylene | 1,000 |
| | Methyl isobutyl ketone | 1,500 |
| Charge 2 | Di-t-amyl Peroxide | 100 |
| Charge 3 | Acrylic Acid | 1,000 |

Charge 1 was added to a stainless steel pressure reaction vessel equipped with an agitator, a thermocouple, and a $N_2$ inlet, placed under a 5 psi $N_2$ pad, and heated to 150° C. Charge 2 was added to the reaction flask over a 2.5-hour period. After 15 minutes, Charge 3 was added to the reaction flask over a 2-hour period. During the monomer addition, the temperature was maintained at 150° C. and pressure at 250 psi. After Charge 2 and Charge 3 were in the reaction flask, the reaction mixture was held for 2 hours. The reaction flask was then cooled to 25° C. GC analysis of the reaction mixture showed that all of the acrylic acid was reacted. The reaction flask was then equipped for simple vacuum distillation and the reaction mixture heated to 115° C. to remove the unreacted isobutylene and solvent. The solids of the resulting polymer were determined to be 100 wt. %, at 110° C. for one hour. The copolymer had Mn=1580 and Mw/Mn=2.2 (determined by gel permeation chromatography using polystyrene standards). The acid value of the powder was 406.

Epoxy-acid powder clear coat compositions identified as Examples E through I in Table 5 were prepared using the components and amounts (parts by weight) shown, and processed in the following manner. The components were blended in a Henschel Blender for 60 to 90 seconds. The mixtures were then extruded through a Werner & Pfleider co-rotating twin screw extruder at a 450 RPM screw speed and an extrudate temperature of 100° C. to 125° C. The extruded material was then ground to a mean particle size of 17 to 27 μm using an ACM 2 (Air Classifying Mill from Hosakowa Micron Powder Systems). The finished powders were electrostatically sprayed onto test panels and evaluated for appearance.

TABLE 5

| Description | Example E Comparative | Example F | Example G | Example H | Example I |
|---|---|---|---|---|---|
| GMA Functional Acrylic[17] | 53.20 | 44.00 | 43.28 | 38.93 | 48.82 |
| Dodecanedioic Acid | 20.86 | 9.06 | 8.95 | 8.29 | 9.78 |
| Polymer of Example A | | 21.34 | | | |
| Polymer of Example B | | | 22.17 | | |
| Polymer of Example C | | | | 27.18 | |
| Polymer of Example D | | | | | 15.8 |
| Benzoin | 0.20 | 0.20 | 0.20 | 0.20 | 0.20 |
| Wax C Micropowder[18] | 0.60 | 0.60 | 0.60 | 0.60 | 0.60 |
| Tinuvin 144[19] | 2.00 | 2.00 | 2.00 | 2.00 | 2.00 |
| CGL-1545[20] | 2.00 | 2.00 | 2.00 | 2.00 | 2.00 |
| HCA-1[21] | 1.00 | 2.00 | 2.00 | 2.00 | 2.00 |

TABLE 5-continued

| Description | Example E Comparative | Example F | Example G | Example H | Example I |
|---|---|---|---|---|---|
| ARMEEN M2C[22] | 1.30 | 1.30 | 1.30 | 1.30 | 1.30 |
| Acrylic Flow Additive[23] | 17.50 | 17.50 | 17.50 | 17.50 | 17.50 |
| Total | 100.00 | 100.00 | 100.00 |  | 100.00 |

[17]U.S. Pat. No. 6,277,917 Example B.
[18]Fatty acid amide (ethylene bis-stearoylamide), available from Hoechst-Celanese, Summerville, NJ.
[19]2-tert-butyl-2-(4-hydroxy-3,5-di-tert-butylbenzyl) [bis(methyl-2,2,6,6-tetramethyl-4-piperidinyl)]dipropionate), an ultraviolet light stabilizer available from Ciba Specialty Chemicals, Basel, Switzerland
[20](2-[4(((2-Hydroxy-3-(2-ethylhexyloxy)propyl)-oxy]-2-hydroxyphenyl)-4,6-bis(2,4-dimethylphenyl)-1,3,5-triazine), an ultraviolet light stabilizer available from Ciba Specialty Chemicals
[21]Anti-yellowing agent (antioxidant) available from Sanko Chemical Corp., Fukuoka, Japan
[22]Methyl dicocanamine available from Akzo-Nobel Corp., Arnhem, the Netherlands
[23]U.S. Pat. No. 6,197,883 B1

The powder coating composition of Examples E through I were prepared for testing in the following manner. The test panels, pre-coated with an electrocoat primer commercially available from PPG Industries, Inc. as ED5000 were coated with a primer/surfacer and a basecoat by spray application to a film thickness of 1.4 mils (36 microns) and 0.4 mils (9.4 microns), respectively, with a black solventborne primer commercially available from Akzo-Nobel Corp., and a waterborne black basecoat from BASF Corporation. The basecoat panels were flashed 10 minutes at 176° F. (80° C.) before electrostatically applying the powder clearcoat compositions of Examples E through I. The powder coatings were applied at 2.2–2.6 mils (55–65 microns) film thickness and cured for 30 minutes at 293° F. (145° C.). The panels were then tested for coating properties, including acid resistance. The acid resistance test used was a 36% sulfuric acid solution applied by 5 μL drops to a panel heated to 65° C. One drop is applied on the panel every minute for 30 minutes. At the end of the test, the panel is rinsed with deionized water and rated for damage. A + indicates a moderate improvement over the control. A ++ indicates a major improvement over the control.

Mar resistance was evaluated using an Atlas Mar Tester. A 2 inch by 2 inch piece of 2 micron abrasive paper (available from 3M, St. Paul, Minn.)was placed over a felt cloth clamped to an acrylic finger on the arm of the instrument. A set of ten double rubs were run on panels prepared as described above. The panels were washed with cool tap water and dried. Mar resistance was evaluated as the percentage of the 20° Gloss value which was retained after the surface was marred by the mar tester. Mar resistance (Mar: 2μ) was measured as: Mar Resistance=(Marred Gloss/Original Gloss)×100. A + indicates a moderate improvement over the control. Results are reported in Table 6.

TABLE 6

|  | Example E Comparative | Example F | Example G | Example H | Example I |
|---|---|---|---|---|---|
| Acid Resistance |  |  |  |  |  |
| Damage | Control | ++ | ++ | ++ | ++ |
| Mar Resistance |  |  |  |  |  |
| Mar: 2μ | Control | + | + | + | + |

The data presented in Table 6 illustrates that the powder clearcoat compositions of the present invention (Examples F, G, H, and I) provide improved acid resistance and mar resistance over that of the Comparative Example E.

EXAMPLE 2

The ingredients in Table 7 were used to synthesize an alternating copolymer, diisobutylene-alt-hydroxy ethyl acrylate/methyl acrylate/isobornyl acrylate, Example J.

TABLE 7

| | Ingredients | Parts by weight (grams) |
|---|---|---|
| Charge 1 | Diisobutylene | 1,568 |
| | n-Methoxypropanol[15] | 200 |
| Charge 2 | t-Amylperoxy(2-ethyl hexanoate)[16] | 24.5 |
| Charge 3 | Hydroxyethyl acrylate | 255.5 |
| | Methyl acrylate | 223.6 |
| | Isobornyl Acrylate | 158.4 |

[15]DOWANOL ® PM solvent, Dow Chemical Co., Midland MI
[16]LUPEROX 575, ATOFINA, Paris, France Charge 1 was added to a reaction flask equipped with an agitator, a thermocouple, and a $N_2$ inlet, placed under a blanket of $N_2$, and heated to 103° C. Charge 2 was added to the reaction flask over a 4-hour period. After 15 minutes, Charge 3 was added to the reaction flask over a 4-hour period. During the monomer addition, the temperature was maintained at 103° C. After Charge 2 and Charge 3 were in the reaction flask, the reaction mixture was held for 2 hours. The reaction flask was then cooled to 25° C. GC analysis of the reaction mixture showed that all of the acrylates were reacted. The reaction flask was then equipped for simple vacuum distillation and the reaction mixture heated to 80° C. to remove the unreacted diisobutylene and solvent. The solids of the resulting polymer were determined to be 97.8 wt. %, determined at 110° C. for one hour. The copolymer had Mn=1700 and Mw/Mn=5.1 (determined by gel permeation chromatography using polystyrene standards). The hydroxyl number of the powder was 142.6.

A powder coating was prepared as described in Table 8 using the components and amounts (parts by weight) shown.

TABLE 8

| Ingredients | Example K |
|---|---|
| Polymer of Example J | 232 |
| Uretadione-butanediol adduct[25] | 180 |
| TiO$_2$ Pigment[26] | 200 |
| Benzoin | 2 |
| Dibutyl tin dilaurate on silica[27] | 2 |

[25]VESTAGON BF 1540, available from Degussa, A.G., Düsseldorf, Germany
[26]Ti Pure R-706, available from E.I. du Pont de Nemours and Company, Wilmington, DE
[27]Butaflow BT-71, available from Estron Chemical, Inc., Calvert City, KY The powder coating was prepared and processed in the following manner. The components were blended in a Prism Blender for 15 to 30 seconds. The mixtures were then extruded through a Werner & Pfleider co-rotating twin screw extruder at a 450 RPM screw speed and an extrudate temperature of 100° C. to 125° C. The extruded material was cooled to room temperature and then ground to a median particle size of 30 to 50 microns using an ACM Grinder (Air Classifying Mill from Micron Powder Systems, Summit, N.J.). Cold rolled steel test panels pretreated with Bonderite 1000 were obtained from ACT Laboratories. The finished powders were electrostatically sprayed onto test panels and baked for 20 minutes at 380° F. (193° C.)

Gloss was measured with a Haze-gloss Reflectometer Model 4601 available from BYK-Gardner. The Gloss measured at 20° was 73.6 and the Gloss measured at 60° was 87.9. Solvent resistance was determined with methyl ethyl ketone (MEK). A cloth was saturated with MEK and rubbed back and forth (double rub) 50 times. No change to the appearance of the coating was observed.

The present invention has been described with reference to specific details of particular embodiments thereof. It will be appreciated by those skilled in the art that changes could be made to the embodiments described above without departing from the broad inventive concept thereof. It is not intended that such details be regarded as limitations upon the scope of the invention except insofar as and to the extent that they are included in the accompanying claims.

We claim:

1. A thermosetting composition comprising a co-reactable solid, particulate mixture of:
   (a) a film forming material comprising functional groups; and
   (b) a crosslinking agent having at least two functional groups that are reactive with the functional groups in the film forming material (a) comprising a copolymer composition comprising at least 30 mol % of residues having the following alternating structural units:

—[DM—AM]— wherein DM represents a residue from a donor monomer selected from the group consisting of isobutylene, diisobutylene, dipentene, isoprene, isoprenol, 1-octene, and mixtures thereof; and AM represents a residue from one or more acrylic acceptor monomers.

2. The thermosetting composition of claim 1, wherein the film forming material comprising functional groups (a) comprises a polymer comprised of residues of acrylate monomers, methacrylate monomers, and mixtures thereof.

3. The thermosetting composition of claim 1, wherein the functional groups of the film forming material (a) are selected from the group consisting of epoxy, carboxylic acid, hydroxy, thiol, isocyanate, capped isocyanate, amide, amine, acetoacetate, methylol, methylol ether, oxazoline, carbamate, and beta-hydroxyalkylamide; the functional groups of the crosslinking agent (b) are selected from the group consisting of epoxy, carboxylic acid, hydroxy, thiol, amide, amine, oxazoline, acetoacetate, methylol, methylol ether, isocyanate, capped isocyanate, beta hydroxyalkamide, and carbamate; and wherein the functional groups of the film forming material (a) are reactive with those in the crosslinking agent (b).

4. The thermosetting composition of claim 2, wherein the polymer in (a) comprises residues of monomers containing epoxy functional groups and the acrylic acceptor monomers in the crosslinking agent (b) include one or more carboxylic acid functional acrylic monomers.

5. The thermosetting composition of claim 4, wherein the carboxylic acid functional acrylic monomers include acrylic acid.

6. The thermosetting composition of claim 1, in which the donor monomer is selected from the group consisting of isobutylene, diisobutylene, isoprene, and mixtures thereof.

7. The thermosetting composition of claim 6, wherein the copolymer in (b) has a number average molecular weight of from 500 to 30,000 and a polydispersity index of less than 4.

8. The thermosetting composition of claim 6, wherein the polymer in (a) has a number average molecular weight of from 500 to 30,000 and a polydispersity index of less than 4.

9. The thermosetting composition of claim 6, wherein the copolymer in (b) has a functional group equivalent weight of from 100 to 5,000 grams/equivalent.

10. The thermosetting composition of claim 6, wherein the polymer in (a) has a functional group equivalent weight of from 100 to 5,000 grams/equivalent.

11. The thermosetting composition of claim 6, wherein the equivalent ratio of functional group equivalents in the copolymer of crosslinking agent (b) to functional group equivalents in the polymer in (a) is within the range of 1:3 to 3:1.

12. The thermosetting composition of claim 6, wherein said crosslinking agent (b) is present in an amount of from 1 to 45 percent by weight, based on total weight of resin solids, and said film forming material (a) is present in an amount of from 55 to 99 percent by weight, based on total weight of resin solids.

13. The thermosetting composition of claim 6, wherein the crosslinking agent (b) further comprises one or more polycarboxylic acid functional materials selected from the group consisting of $C_4$ to $C_{20}$ aliphatic carboxylic acids, polymeric polyanhydrides, carboxylic acid functional polyesters, and carboxylic acid functional polyurethanes.

14. The thermosetting composition of claim 13, wherein the $C_4$ to $C_{20}$ aliphatic carboxylic acids are selected from the group consisting of dodecanedioic acid, azelaic acid, adipic acid, 1,6-hexanedioic acid, succinic acid, pimelic acid, sebacic acid, maleic acid, citric acid, itaconic acid, aconitic acid, and mixtures thereof.

15. The thermosetting composition of claim 6, wherein the acrylic acceptor monomers are one or more described by structure (III):

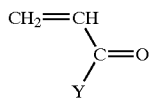

(III)

wherein Y is selected from the group consisting of —NR$^3_2$, —O—R$^5$—O—C(=O)—NR$^3_2$, and —OR$^4$; R$^3$ is selected from the group consisting of H, linear or branched C$_1$ to C$_{20}$ alkyl, and linear or branched C$_1$ to C$_{20}$ alkyl, aryl, or aralkyl containing one or more epoxy, carboxylic acid, hydroxy, thiol, amide, amine, oxazoline, acetoacetate, methylol, methylol ether, isocyanate, capped isocyanate, beta hydroxyalkamide, or carbamate functional groups; R$^4$ is selected from the group consisting of H, linear or branched C$_1$ to C$_{20}$ alkyl, aryl, or aralkyl containing one or more epoxy, carboxylic acid, hydroxy, thiol, amide, amine, oxazoline, acetoacetate, methylol, methylol ether, isocyanate, capped isocyanate, beta hydroxyalkamide, or carbamate functional groups; and R$^5$ is a divalent linear or branched C$_1$ to C$_{20}$ alkylene linking group.

16. The thermosetting composition of claim 1, wherein the acrylic acceptor monomer is one or more selected from the group consisting of hydroxyethyl acrylate, hydroxypropyl acrylate, acrylic acid, dimethylaminoethyl acrylate, acrylamide, glycidyl acrylate, glycidyl methacrylate, N-(butoxymethyl)acrylamide, hydroxyethyl methacrylate, hydroxypropyl methacrylate, methacrylic acid, methacrylamide, 2-carbamoyloxyethyl acrylate, 2-carbamoyloxyethyl methacrylate, 2-carbamoyloxypropyl acrylate, 2-carbamoyloxypropyl methacrylate, 2-isocyanatoethyl acrylate, 2-isocyanatoethyl methacrylate, 2-isocyanatopropyl acrylate, 2-isocyanatopropyl methacrylate, 2-[2-(acryloyloxy)ethyl]-2-oxazoline, 2-(2-(methacryloyloxy)ethyl]-2-oxazoline, 2-[2-(acryloyloxy)propyl]-2-oxazoline, 2-[2-(methacryloyloxy)propyl]-2-oxazoline, acetoacetate ester of hydroxyethyl acrylate, acetoacetate ester of hydroxyethyl methacrylate, acetoacetate ester of hydroxypropyl methacrylate, and acetoacetate ester of hydroxypropyl acrylate.

17. A thermosetting composition comprising a co-reactable solid, particulate mixture of:

(a) a film forming material comprising an acrylic copolymer comprised of residues of epoxy functional monomers selected from the group consisting of glycidyl acrylate, glycidyl methacrylate, allyl glycidyl ether, vinyl glycidyl ether, and mixtures thereof; and residues of acrylate monomers and methacrylate monomers selected from the group consisting of linear and branched C$_1$ to C$_{20}$ alkyl, aryl, alkaryl, and aralkyl esters of acrylic acid, C$_1$ to C$_{20}$ alkyl, aryl, alkaryl, and aralkyl esters of methacrylic acid and mixtures thereof; and (b) a crosslinking agent having at least two functional groups that are reactive with the functional groups in the film forming material (a) comprising a copolymer comprised of at least 30 mol % of residues having the following alternating structural units:

—[DM—AM]— wherein DM represents a residue from a donor monomer selected from the group consisting of isobutylene, diisobutylene, dipentene, isoprene, isoprenol, 1-octene, and mixtures thereof; and AM represents a residue from one or more acrylic acceptor monomers selected from the group consisting of acrylic acid and methacrylic acid.

18. A method of coating a substrate comprising:

(A) applying the thermosetting composition of claim 1 to the substrate;

(B) coalescing the thermosetting composition to form a substantially continuous film; and (C) curing the thermosetting composition.

19. A method of coating a substrate comprising:

(A) applying the thermosetting composition of claim 17 to the substrate;

(B) coalescing the thermosetting composition to form a substantially continuous film; and (C) curing the thermosetting composition.

20. A substrate coated using the method of claim 18.

21. A substrate coated using the method of claim 19.

* * * * *